US012806969B2

United States Patent
(12) United States Patent
An et al.

(10) Patent No.: US 12,806,969 B2
(45) Date of Patent: Nov. 24, 2026

(54) AIR VENT FOR VEHICLE

(71) Applicants: HYUNDAI MOTOR COMPANY, Seoul (KR); KIA CORPORATION, Seoul (KR); ITW EF & C KOREA LLC., Incheon (KR)

(72) Inventors: Seong Min An, Seoul (KR); Dong Chan Kim, Hwaseong-si (KR); Kwang Woon Cho, Yongin-si (KR); Yong Seok Park, Seoul (KR); Byung Jo Kim, Incheon (KR); Chun Ha Kim, Seoul (KR)

(73) Assignees: HYUNDAI MOTOR COMPANY, Seoul (KR); KIA CORPORATION, Seoul (KR); ITW EF & C KOREA LLC., Incheon (KR)

( * ) Notice: Subject to any disclaimer, the term of this patent is extended or adjusted under 35 U.S.C. 154(b) by 363 days.

(21) Appl. No.: 18/613,460

(22) Filed: Mar. 22, 2024

(65) Prior Publication Data

US 2025/0206105 A1 Jun. 26, 2025

(30) Foreign Application Priority Data

Dec. 21, 2023 (KR) ........................ 10-2023-0187828

(51) Int. Cl.
*B60H 1/34* (2006.01)
*B60H 1/00* (2006.01)

(52) U.S. Cl.
CPC ....... *B60H 1/3428* (2013.01); *B60H 1/00021* (2013.01); *B60H 1/0065* (2013.01);
(Continued)

(58) Field of Classification Search
CPC .............. B60H 1/3428; B60H 1/00021; B60H 1/0065; B60H 1/00678; B60H 2001/00192; B60H 2001/00707; B60H 2001/00721
(Continued)

(56) References Cited

U.S. PATENT DOCUMENTS 6,863,603 B2 * 3/2005 Demerath ............ B60H 1/3421 454/155
6,893,338 B2 * 5/2005 Katagiri .................. F24F 13/15 454/155
(Continued)

FOREIGN PATENT DOCUMENTS

CN 111731077 A 10/2020
CN 113147329 A 7/2021
(Continued)

*Primary Examiner* — Avinash A Savani
*Assistant Examiner* — Dana K Tighe
(74) *Attorney, Agent, or Firm* — MCDONNELL BOEHNEN HULBERT & BERGHOFF LLP

(57) ABSTRACT

An air vent for a vehicle includes a housing provided with an air outlet, a front wing module mounted within the housing and configured to adjust air discharged through the air outlet in left and right directions, a rear wing module mounted within the housing by being spaced apart from the front wing module and configured to adjust air discharged through the air outlet in up and down directions, and a manipulation module connected to the front wing module and to the rear wing module from outside the housing by being spaced apart from the air outlet, and configured to adjust air discharged through the air outlet in left and right or up and down directions.

14 Claims, 13 Drawing Sheets

(52) U.S. Cl.
CPC .................... *B60H 1/00678* (2013.01); *B60H 2001/00192* (2013.01); *B60H 2001/00707* (2013.01); *B60H 2001/00721* (2013.01)

(58) Field of Classification Search
USPC .......................................................... 454/155
See application file for complete search history.

(56) References Cited

U.S. PATENT DOCUMENTS

| | | | | |
|---|---|---|---|---|
| 7,455,581 | B2 * | 11/2008 | Gehring | B60H 1/3428<br>454/155 |
| 11,280,517 | B1 * | 3/2022 | Jovicic | F24F 13/15 |
| 2004/0203334 | A1 * | 10/2004 | Shibata | B60H 1/3428<br>454/155 |
| 2017/0057325 | A1 | 3/2017 | Brinas | |
| 2021/0094392 | A1 * | 4/2021 | Munoz | B60H 1/3421 |
| 2023/0311620 | A1 * | 10/2023 | Ariki | B60H 1/3421<br>454/155 |

FOREIGN PATENT DOCUMENTS

| | | | |
|---|---|---|---|
| CN | 113696697 | A | 11/2021 |
| KR | 2010-0058374 | A | 6/2010 |

* cited by examiner

AIR VENT FOR VEHICLE

CROSS REFERENCE TO RELATED APPLICATIONS

This application claims, under 35 U.S.C. § 119 (a), the benefit of and priority to Korean Patent Application No. 10-2023-0187828, filed on Dec. 21, 2023, the entire contents of which are incorporated herein by reference.

TECHNICAL FIELD

The present disclosure relates to an air vent for a vehicle, and more particularly, to an air vent for a vehicle having a structure in which a wing knob for adjusting the direction of wind is installed not to block an outlet, preventing poor ventilation resistance and collision with discharged wind.

BACKGROUND

Generally, a vehicle's air-conditioning system not only serves to cool or heat the interior of the vehicle, purify the air, and maintain appropriate humidity to keep the air inside the vehicle comfortable, but also prevents frost from fogging the windshield glass to ensure driver's visibility, providing safe traveling condition.

For this purpose, an air vent is installed in a dashboard in front of driver's and passenger's seats. The air vent is an air discharge means of the air-conditioning system to maintain the interior temperature at an appropriate level. The direction of air discharged from the air vent may be adjusted by manipulating a wing mounted at the front surface of the air vent, and discharge of air may be controlled by opening and closing a damper installed within the air vent.

By adjusting the direction of discharged air and controlling opening and closing, the driver and passenger may travel comfortably without feeling hot or cold inside the vehicle.

In this regard, an air vent for a vehicle according to the prior art has a structure in which the inclination angles of a front wing and a rear wing may be adjusted by manipulating a wing knob, and a driver or passenger may manipulate the front and rear wings using the wing knob to allow cold or warm air from a duct to be discharged in a desired direction.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to solve the above-described problems associated with the prior art, and an object of the present disclosure is to provide an air vent for a vehicle, the air vent having a structure in which a wing knob for adjusting the direction of wind is installed not to block an outlet, and the inclination angles of a front wing and a rear wing connected to the wing knob may be selectively adjusted by rotating the wing knob in up-down and left-right directions, preventing the wing knob from disturbing the wind discharged through the outlet.

In one aspect, the present disclosure provides an air vent for a vehicle, the air vent including a housing provided with an air outlet, a front wing module mounted within the housing and configured to adjust air discharged through the air outlet in left and right directions, a rear wing module mounted within the housing by being spaced apart from the front wing module and configured to adjust air discharged through the air outlet in up and down directions, and a manipulation module connected to the front wing module and to the rear wing module from outside the housing by being spaced apart from the air outlet, and configured to adjust air discharged through the air outlet in left and right or up and down directions.

In a preferred embodiment, the rear wing module may include a first rear wing vertically rotatably coupled within the housing, a first assist wing connected to the first rear wing and configured to rotate in conjunction with the first rear wing when the first rear wing rotates and changes in angle, and a rear wing gear coupled to the rotation shaft of the first rear wing and configured to rotate in forward and reverse directions to rotate the first rear wing.

In another preferred embodiment, the rear wing module may further include a second rear wing having a shape identical to that of the first rear wing and vertically rotatably coupled within the housing by being downwardly spaced apart from the first rear wing, a second assist wing connected to the second rear wing and configured to rotate in conjunction with the second rear wing when the second rear wing rotates and changes in angle, and a link member to connect the first rear wing to the second rear wing and configured to guide the second rear wing to rotate with a rotation radius same as that of the first rear wing when the first rear wing rotates.

In still another preferred embodiment, the first assist wing and the second assist wing, each having a rotation shaft, may support the first rear wing and the second rear wing, respectively, by the rotation shafts thereof moving to different positions when the first rear wing and the second rear wing rotate with same rotation radius.

In yet another preferred embodiment, the housing may include a spacer configured to support one side and another side of the rear wing module. Here, the spacer may include guide holes each defining movement paths for the rotation shafts of the first assist wing and the second assist wing, respectively.

In still yet another preferred embodiment, the guide hole may extend in length to define the movement path.

In a further preferred embodiment, the manipulation module may include a pivot gear meshing with a mid-gear meshing with the rear wing gear, and a wing knob having one side to which the pivot gear is mounted, and configured to vertically move to pivot within a pivot housing to thereby guide the mid-gear to rotate by the pivot gear moving together with the wing knob.

In another further preferred embodiment, the wing knob may include a main body, forming a rotation axis within the pivot housing, provided with a pivot upper and a pivot lower coupled to each other, and extending rearwards in length to form a rod, and a manipulation member, mounted at the front of the main body and outwardly protruding for gripping.

In still another further preferred embodiment, the main body may include a coupling portion coupled to the rod on the same line as the front wing module, and a holder portion mounted to surround the coupling portion and configured to allow the coupling portion to slide along a guide rail when the wing knob moves up and down.

In yet another further preferred embodiment, the holder portion may be rail-coupled to the guide rail, and when the wing knob moves in left and right directions, the holder portion may move together with the guide rail in left and right directions.

In still yet another further preferred embodiment, the front wing module may include a front wing coupled within the housing by being rotatable in left and right directions, and a rail shaft connected to the front wing and slidable outwards from the housing.

In a still further preferred embodiment, the front wing may be upright and provided in plural at equal intervals. Here, the front wings may rotate all together in the same direction when one front wing connected to the rail shaft axially rotates.

In still another further preferred embodiment, the manipulation module may be coupled to the rail shaft and may move left and right to allow the rail shaft to reciprocally slide.

In a yet still further preferred embodiment, the air vent for a vehicle may further include a damper module mounted within the housing by being spaced apart from the front wing module and from the rear wing module, and configured to block air discharged through the air outlet In yet another still further preferred embodiment, the damper module may include a damper vertically rotatably coupled within the housing, a bevel gear engaged with a damper gear connected to the rotation shaft of the damper and configured to transmit a driving force for rotating the damper, and a connection rod connected to the manipulation module and configured to transmit the driving force for rotating the damper to the bevel gear by rotating together with the rotation of the manipulation module.

In yet another still further preferred embodiment, the connection rod may be connected to the manipulation module via a universal joint.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
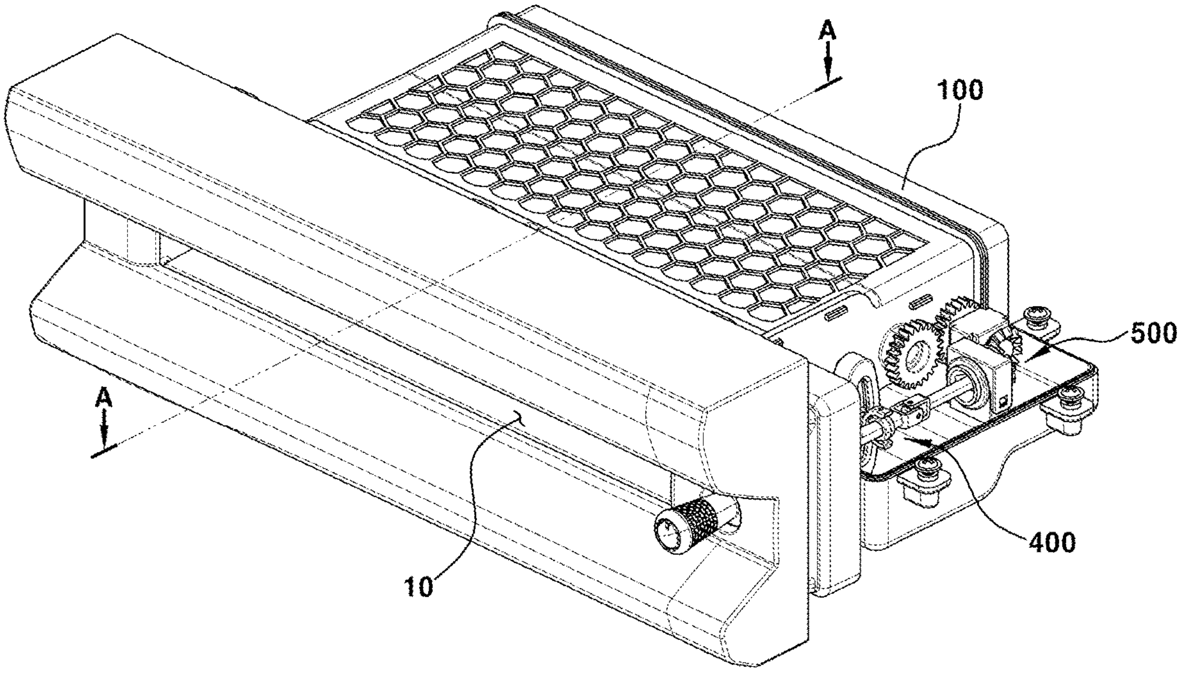
FIG. 1 is a view illustrating an air vent for a vehicle according to an embodiment of the present disclosure.

It should be understood that the appended drawings are not necessarily to scale, presenting a somewhat simplified representation of various preferred features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Hereinafter, preferred embodiments according to the present disclosure will be described in detail with reference to the attached drawings.

Advantages and features of the present disclosure, and a method of achieving the same, will be apparent with reference to the embodiments described below in detail in conjunction with the accompanying drawings.

However, the present disclosure may be embodied in many different forms, and should not be construed as being limited to the embodiments set forth herein. Rather, the embodiments are provided so that the present disclosure will be thorough and complete, and will fully convey the scope of the present disclosure to those skilled in the art. The present disclosure is defined only by the categories of the claims.

In describing the present disclosure, if a detailed explanation of a related known function or construction is considered to unnecessarily obscure the gist of the present disclosure, such explanation has been omitted but would be understood by those skilled in the art.

Figure 2:
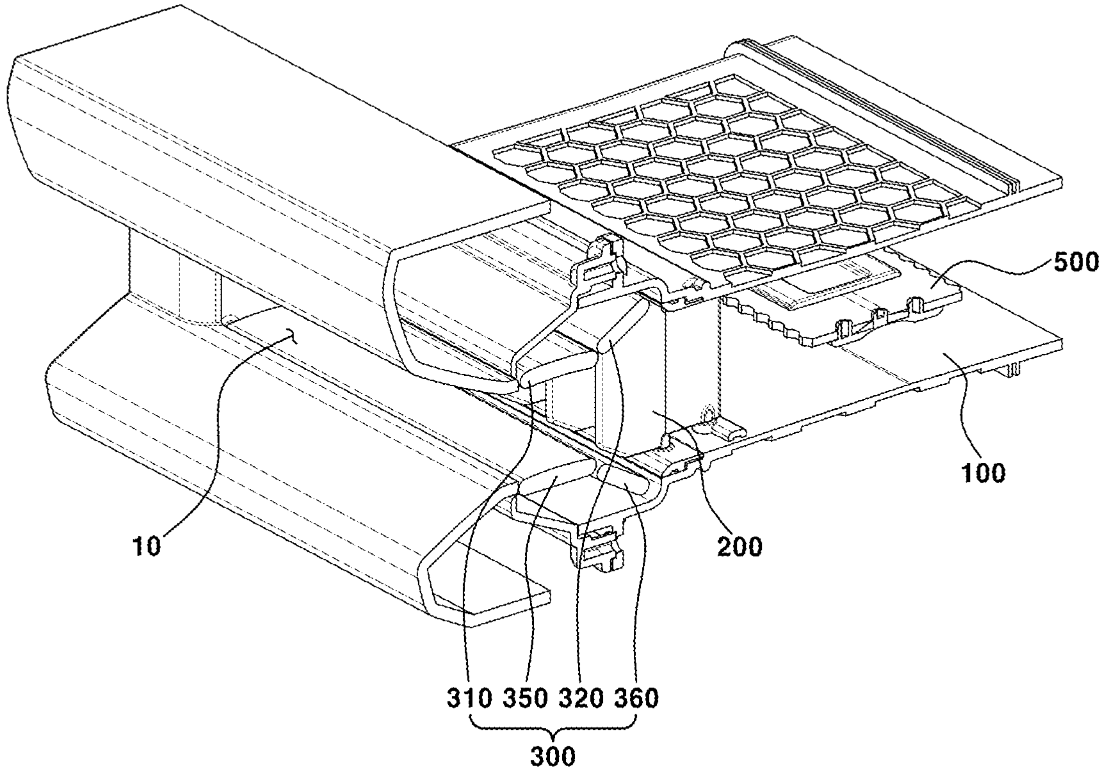
FIG. 2 is a cross-sectional view taken along line A-A in FIG. 1, illustrating the internal structure of a housing of an air vent for a vehicle according to an embodiment of the present disclosure.

FIG. 1 is a view illustrating an air vent for a vehicle according to an embodiment of the present disclosure, and FIG. 2 is a cross-sectional view taken along line A-A in FIG. 1, illustrating the internal structure of a housing of an air vent for a vehicle according to an embodiment of the present disclosure.

Figure 3:
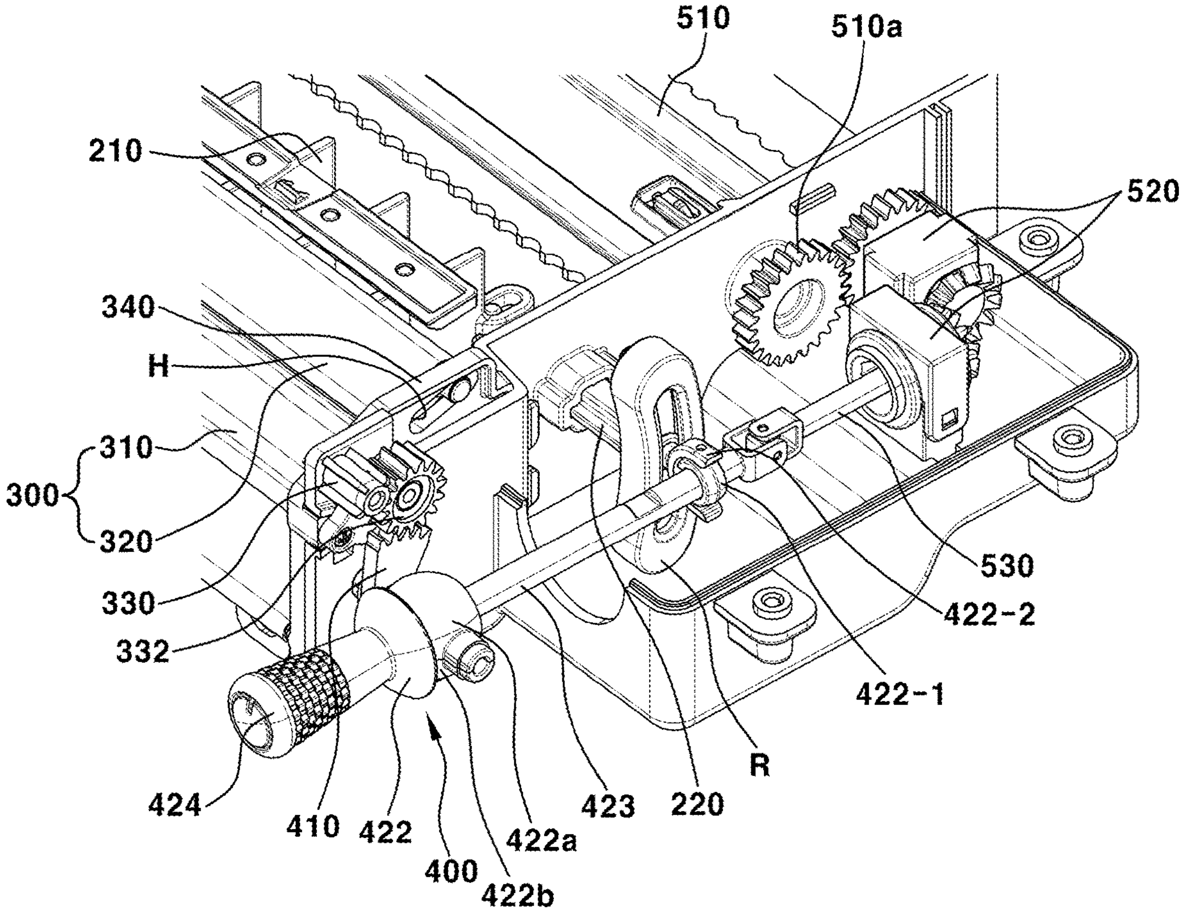
FIG. 3 is a view illustrating a state in which a manipulation module is coupled to an air vent for a vehicle according to an embodiment of the present disclosure.
Figure 4:
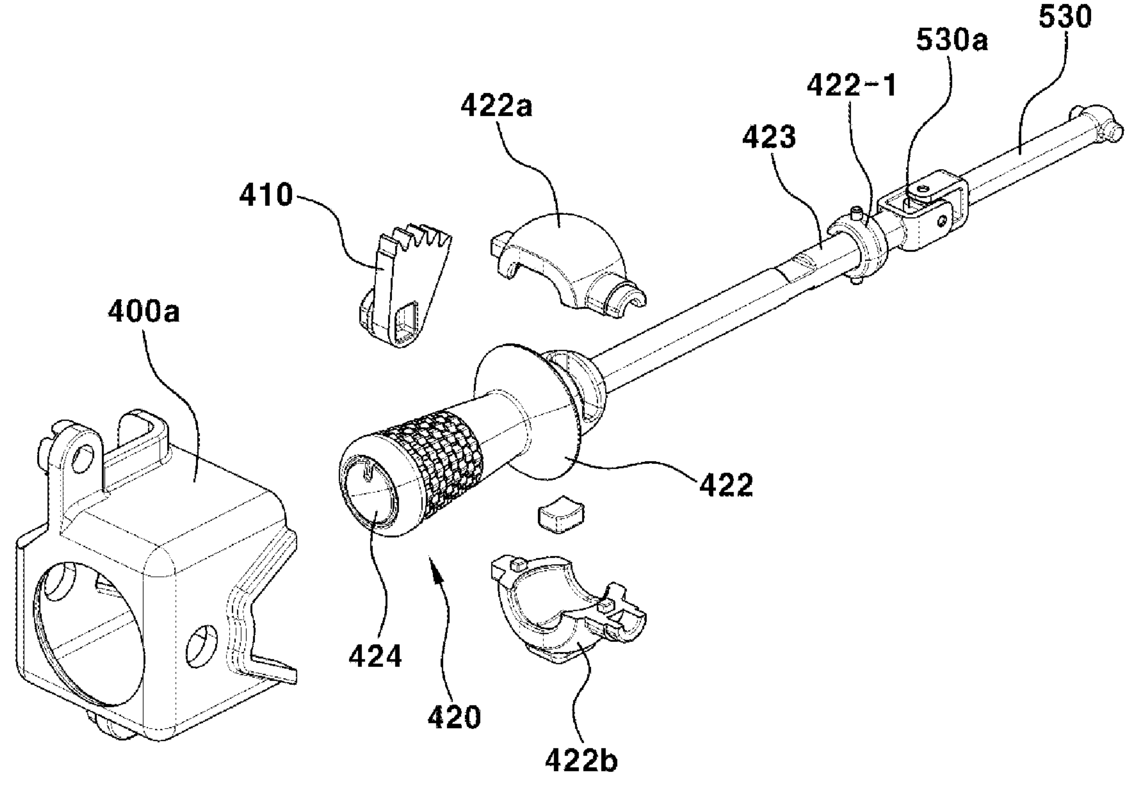
FIG. 4 shows the components of the manipulation module for the air vent for a vehicle according to an embodiment of the present disclosure.

FIG. 3 is a view illustrating a state in which a manipulation module is coupled to an air vent for a vehicle according to an embodiment of the present disclosure, and FIG. 4 shows the components of the manipulation module for the air vent for a vehicle according to an embodiment of the present disclosure.

Figure 5:
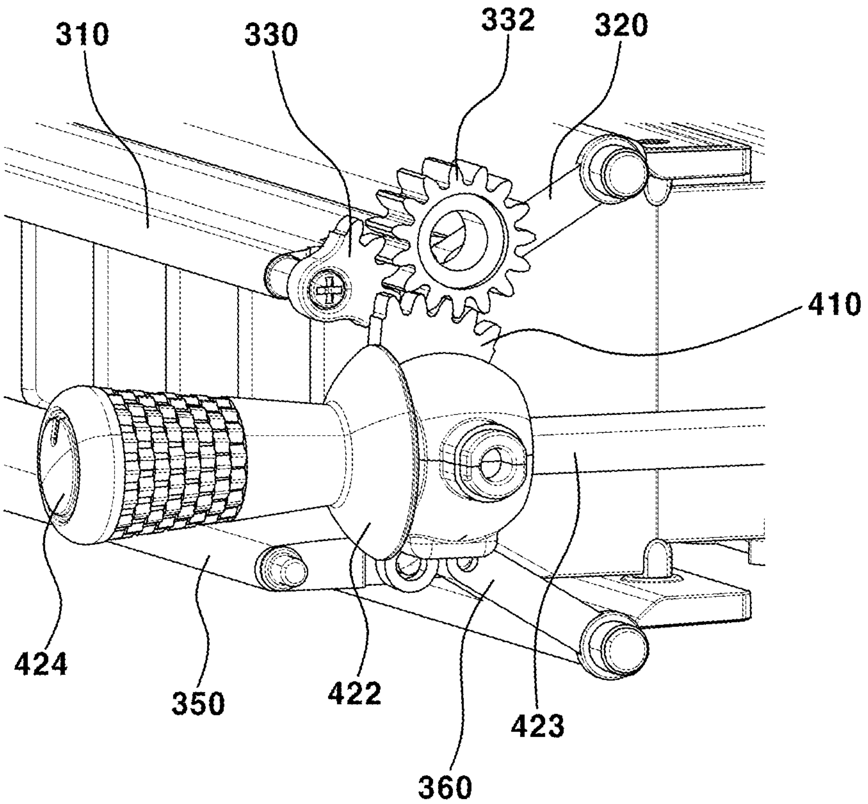
FIG. 5 is a view illustrating a state in which a pivot gear and a mid-gear of the air vent for a vehicle according to an embodiment of the present disclosure mesh with each other.
Figure 6A:
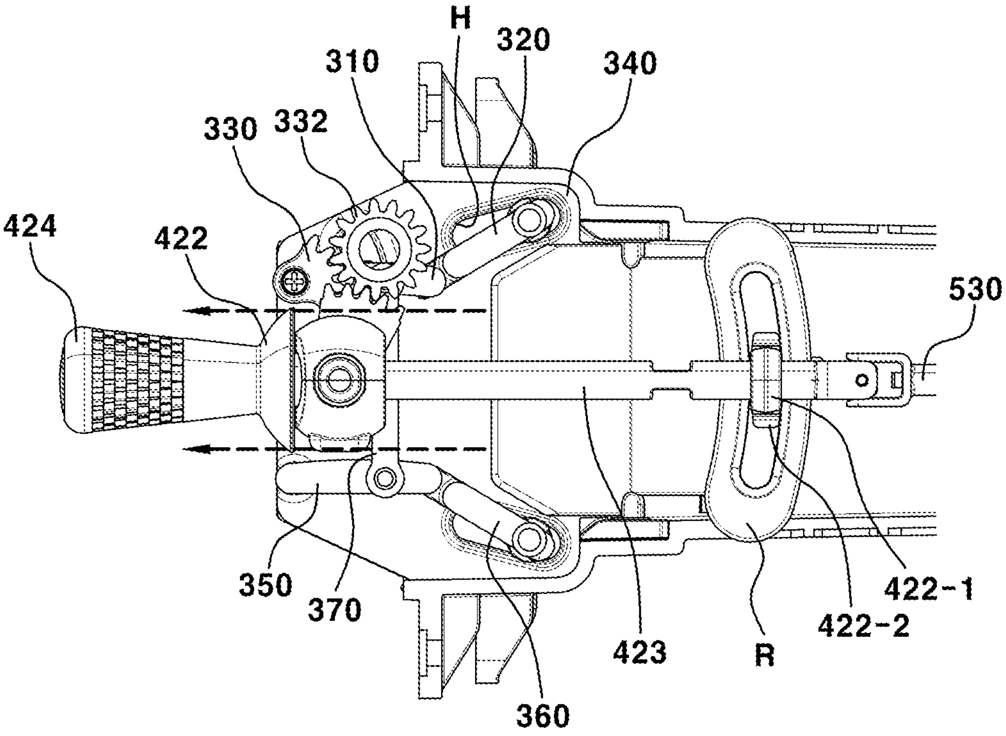
FIGS. 6A, 6B, and 6C are views illustrating the vertical adjustment of the manipulation module for the air vent for a vehicle according to an embodiment of the present disclosure.
Figure 6B:
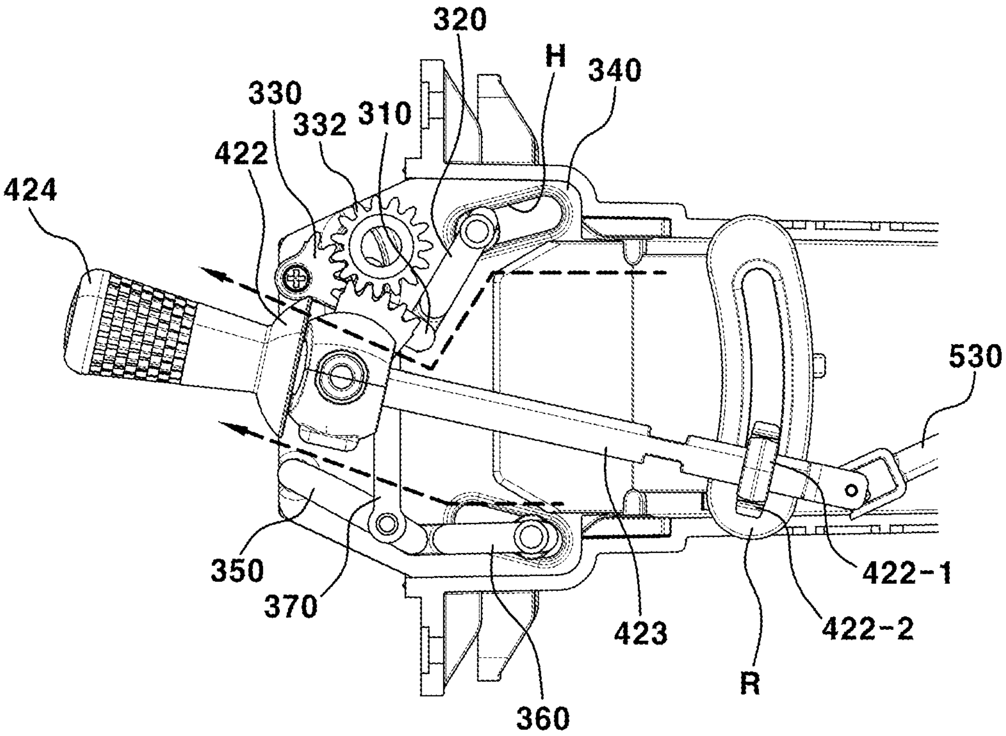
Figure 6C:
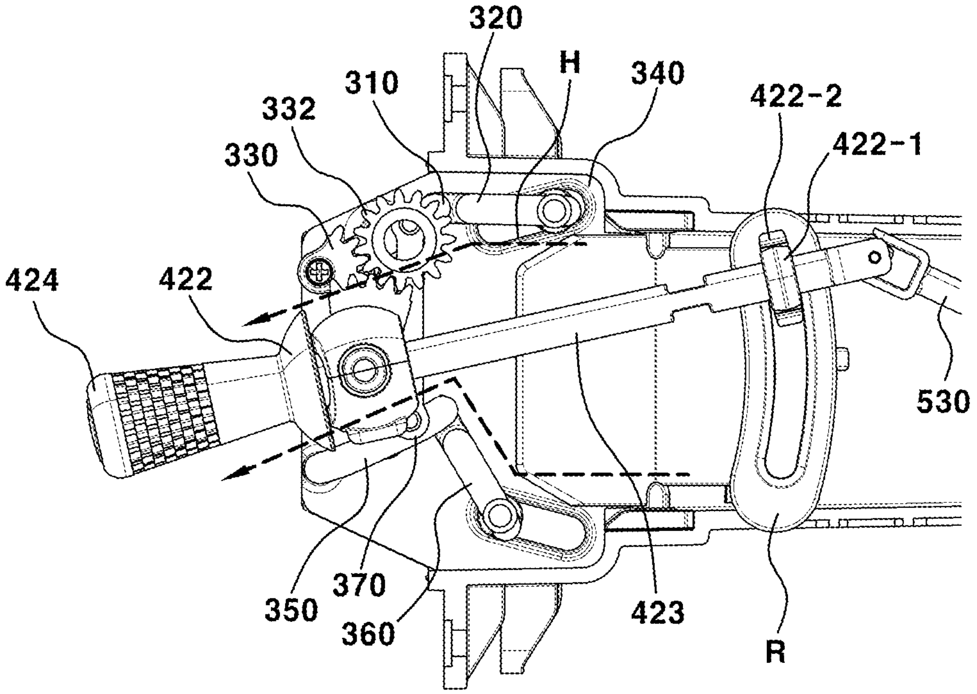

FIG. 5 is a view illustrating a state in which a pivot gear and a mid-gear of the air vent for a vehicle according to an embodiment of the present disclosure mesh with each other, and FIGS. 6A to 6C are views illustrating the vertical adjustment of the manipulation module for the air vent for a vehicle according to an embodiment of the present disclosure.

Figure 7:
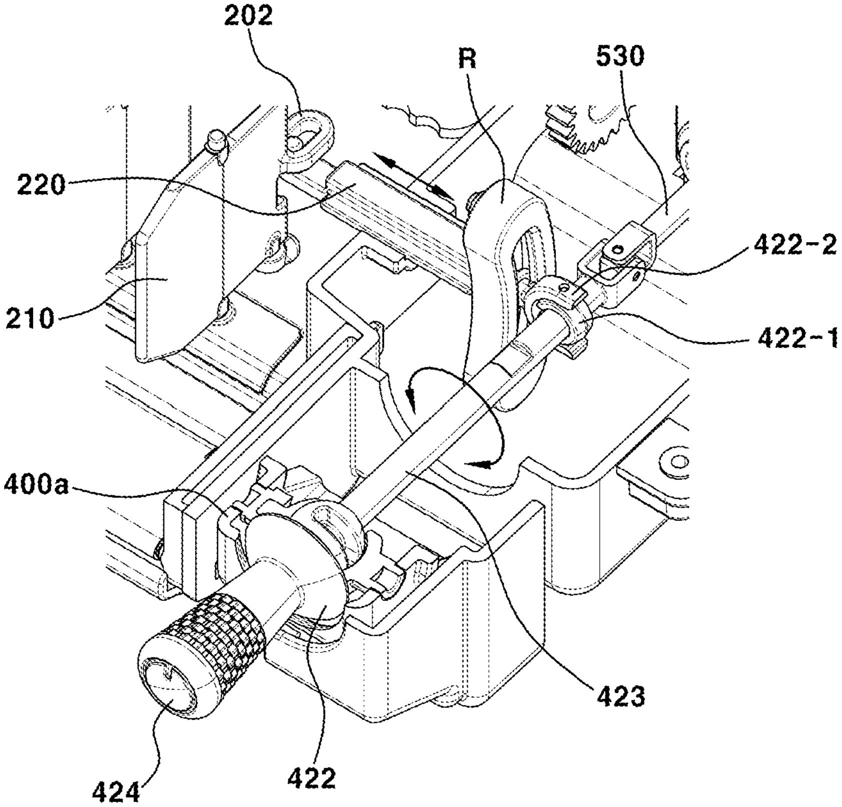
FIG. 7 illustrates a slide movement of a rail shaft in the air vent for a vehicle according to an embodiment of the present disclosure.
Figure 8A:
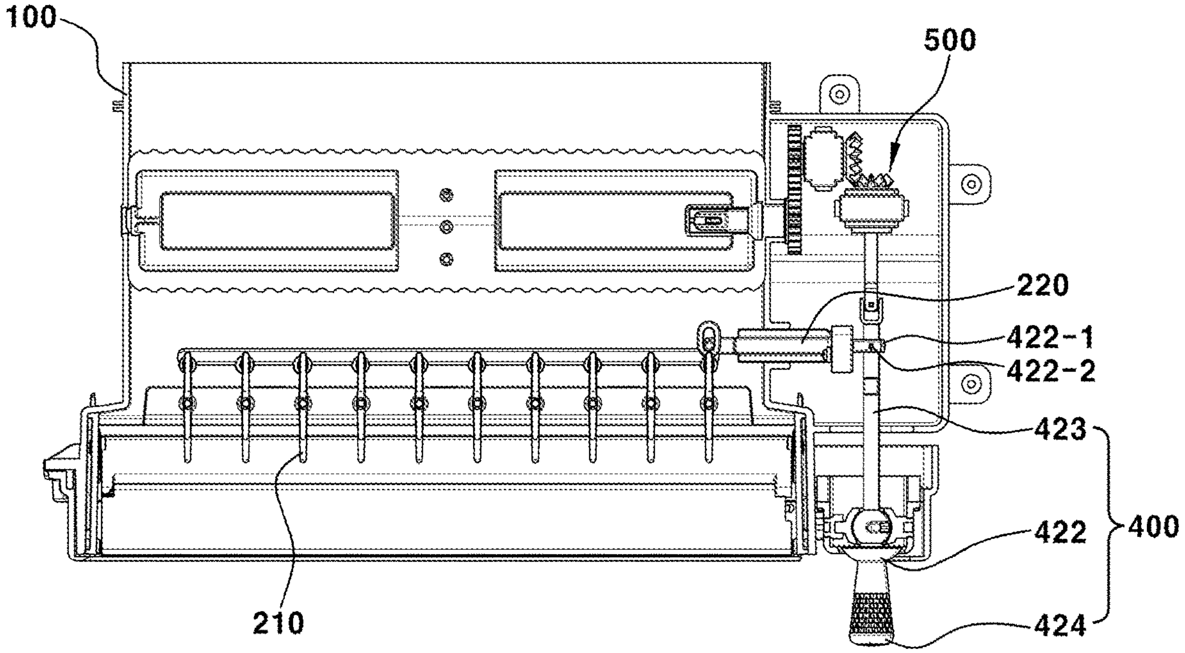
FIGS. 8A, 8B, and 8C are views illustrating the lateral adjustment of the manipulation module for the air vent for a vehicle according to an embodiment of the present disclosure.
Figure 8B:
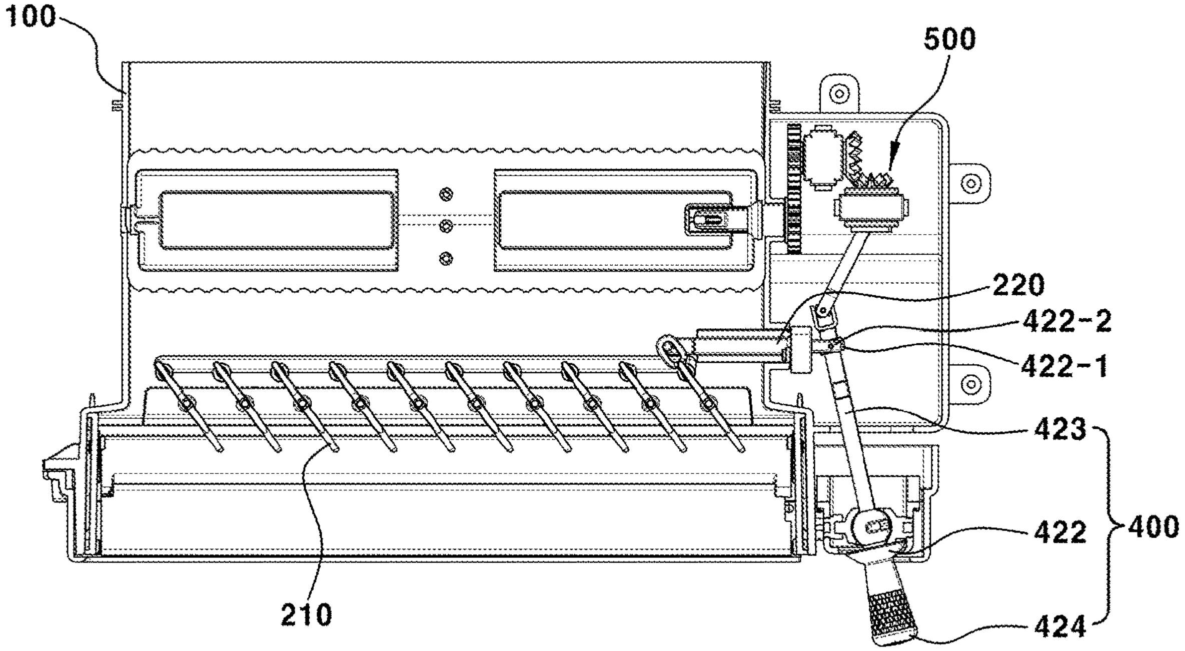
Figure 8C:
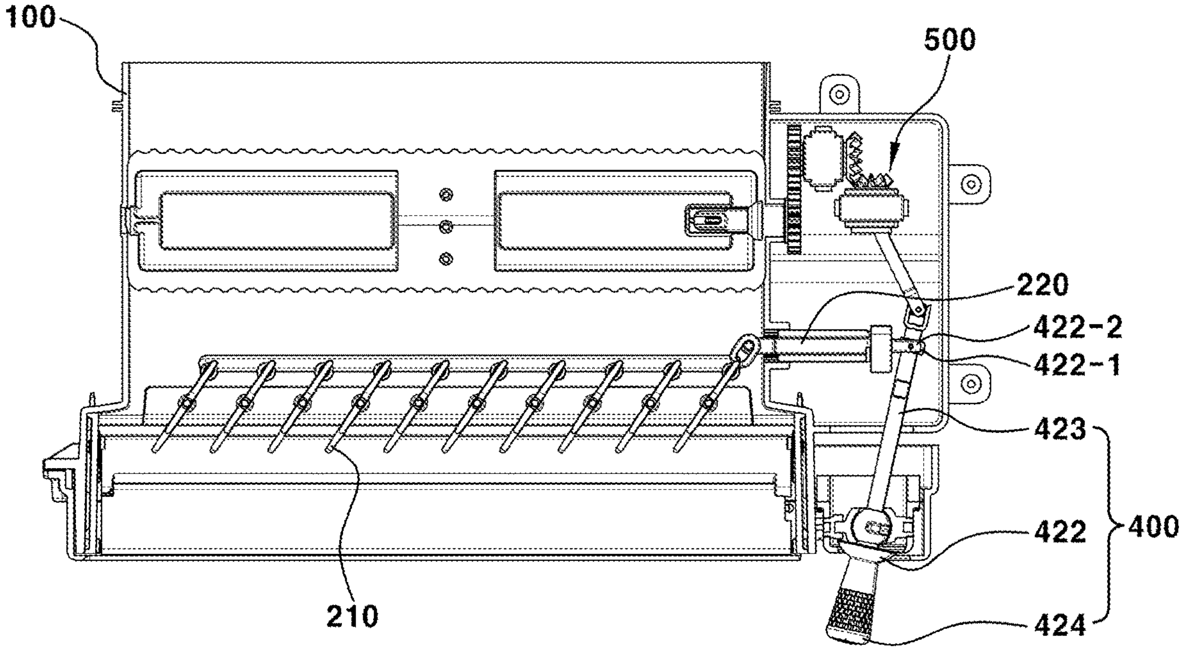

FIG. 7 illustrates a slide movement of a rail shaft in the air vent for a vehicle according to an embodiment of the present disclosure, and FIGS. 8A to 8C are views illustrating the lateral adjustment of the manipulation module for the air vent for a vehicle according to an embodiment of the present disclosure.

Figure 9:
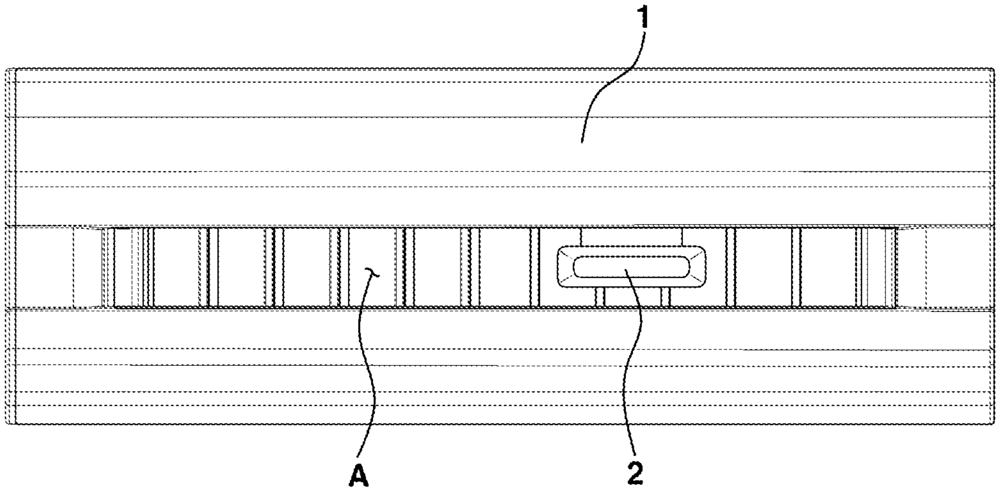
FIG. 9 PRIOR ART
FIG. 9 is a view illustrating an air vent for a vehicle according to the prior art.

As illustrated in FIG. 9, because an air vent 1 for a vehicle according to the prior art has mounted thereon a wing knob 2 having a predetermined size and exposed outside, the wing knob 2 may partially block a discharge area A, causing poor ventilation resistance. Moreover, the discharged wind may collide with the wing knob 2 and split, the wind may not be smoothly discharged in the desired direction.

So as to solve such problems, an air vent for a vehicle according to an embodiment of the present disclosure includes, as illustrated in FIGS. 1 to 2, a housing 100, a front wing module 200, a rear wing module 300, and a manipulation module 400.

The housing 100 includes an air outlet 10 through which cold or warm air supplied from a duct (not shown) is discharged into vehicle interior.

Moreover, the front wing module 200 is mounted within the housing 100 and configured to adjust the direction of air discharged through the air outlet 10 to the left and right by being selectively changed in angle in the left and right directions.

The front wing module 200 includes, as illustrated in FIG. 3, a front wing 210 and a rail shaft 220.

The front wing 210 is coupled within the housing 100 by being rotatable in the left and right directions.

The front wing 210 is upright and is provided in plural at equal intervals. The front wings 210 rotate all together in the same direction when any one of the front wings 210, more specifically, a front wing 210 disposed at the outermost side, axially rotates.

The rail shaft 220 is connected to the front wing 210 disposed at the outermost side, and is slidable outwards from the housing 100 to rotate the front wings 210.

Preferably, as illustrated in FIG. 7, the rail shaft 220 extends in length to be connected to a connection portion 202 of the front wing 210. As such, when the rail shaft 220 slides by the manipulation module 400, the front wings 210 including the front wing 210 disposed at the outermost side rotate all together.

Meanwhile, the rear wing module 300 is mounted within the housing 100 by being spaced apart from the front wing module 200, and may adjust the air discharged through the air outlet 10 in up and down directions while vertically changing in angle.

The rear wing module 300 includes, as illustrated in FIG. 3, a first rear wing 310, a first assist wing 320, and a rear wing gear 330.

The first rear wing 310 is located at an upper side of the housing 100 and is axially coupled to a spacer 340 mounted at a side surface of the housing 100 so as to be vertically rotatable.

The first assist wing 320 is connected to the first rear wing 310. When the first rear wing 310 vertically rotates to change in angle, the first assist wing 320 rotates together therewith and supports the first rear wing 310.

The rear wing gear 330 is integrally coupled to the rotation shaft of the first rear wing 310. When manipulating the manipulation module 400, the rear wing gear 330 rotates in forward and reverse directions at the spacer 340 to rotate the first rear wing 310 in the vertical direction owing to the structure in which the plurality of gears is interlocked.

The rear wing module 300 may further include, as illustrated in FIG. 5, a second rear wing 350, a second assist wing 360, and a link member 370.

The second rear wing 350 has a shape identical to that of the first rear wing 310, is disposed lower than the first rear wing 310 within the housing 100, has a rotation radius same as that of the first rear wing 310, and is axially coupled to the spacer 340 so as to be vertically rotatable within the housing 100.

The second assist wing 360 is connected to the second rear wing 350. In the same way as the first assist wing 320 rotates, when the second rear wing 350 vertically rotates to change in angle, the second assist wing 360 rotates together therewith and supports the second rear wing 350.

That is, as the first rear wing 310 and the second rear wing 350 rotate in the same rotation radius by the link member 370, the rotation shaft of the first assist wing 320 and the rotation shaft of the second assist wing 360 each move within corresponding guide holes H to support the first rear wing 310 and the second rear wing 350, respectively.

In other words, the corresponding rotation shafts of each of the first rear wing 310, the first assist wing 320, the second rear wing, and the second assist wing 360 are coupled to the spacer 340. Here, the rotation shaft of the first assist wing 320 and the rotation shaft of the second assist wing 360 each move along different movement paths within the corresponding guide holes H having a long groove structure, and support the first rear wing 310 and the second rear wing 350 changing in angle, respectively.

The link member 370 connects the first rear wing 310 and the second rear wing 350 to each other. Therefore, when the first rear wing 310 is rotated by the manipulation module 400, the link member 370 guides the second rear wing 350 to rotate at the same angle as the rotation angle of the first rear wing 310.

Meanwhile, in order to prevent the problem of poor ventilation resistance and splitting of discharged wind, the manipulation module 400 is mounted externally of the housing by being spaced apart from the air outlet 10 as in the structure of the air vent for a vehicle of the prior art (see FIG. 9).

The manipulation module 400 is connected to the front wing module 200 and to the rear wing module 300 from outside the housing 100, and selectively adjusts air discharged through the air outlet 10 in left and right or up and down directions by manipulation of a user.

Here, the manipulation module 400 is provided with a pivot gear 410 and a wing knob 420.

The pivot gear 410 meshes with a mid-gear 332 meshing with the rear wing gear 330.

The wing knob 420 has one side to which the pivot gear 410 is mounted. When the wing knob 420 axially moves in the vertical direction within a pivot housing 400*a*, the pivot gear 410 rotates together therewith, guiding the mid-gear 332 to be selectively rotated in forward and reverse directions.

The wing knob 420 includes, as illustrated in FIG. 4, a main body 422 and a manipulation member 424.

The main body 422 forms a rotation axis within the pivot housing 400*a*, is provided with a pivot upper 422*a* and a pivot lower 422*b* coupled to each other, and extends rearwards in length to form a rod 423.

The main body 422 further includes a coupling portion 422-1 and a holder portion 422-2. Here, the coupling portion 422-1 is coupled to the rod 423 on the same line as the front wing module 200, and the holder portion 422-2 is mounted to surround the coupling portion 422-1 and allows the coupling portion 422-1 to rotate therewithin.

More particularly, the holder portion 422-2 is rail-coupled to a guide rail R, and accordingly, when the main body 422 axially moves in the vertical direction within the pivot housing 400*a*, the coupling portion 422-1 reciprocally slides up and down within the guide rail R having an arc shape.

Here, the guide rail R has one side to which the holder portion 422-2 is slidably coupled, and has another side to which the rail shaft 220 fixedly coupled. With this structure, when the front wing module 200 rotates laterally by manipulating the main body 422, the guide rail R slides together with the rail shaft 220, and when the rear wing module 300 rotates vertically, the guide rail R guides the holder portion 422-2 rail-coupled thereto to move up and down.

In other words, because the guide rail R has a structure in which one side thereof is coupled to the holder portion 422-2 and the other side thereof is coupled to the rail shaft 220, the guide rail R may be a mean to slide the rail shaft 220 left and right upon lateral manipulation of the main body 422, and may be a mean to slide the holder portion 422-2 up and down upon vertical manipulation of the main body 422. Therefore, the front wing module 200 and the rear wing module 300 may be selectively adjusted by the lateral and vertical manipulation of the main body 422.

The manipulation member 424 is mounted at the front of the main body 422, and protrudes outward for gripping.

The manipulation member 424 may have a shape whose diameter gradually increases outwards to enable easy manipulation through effective grip, or may be provided with a plurality of bumps on the outer circumferential surface thereof to ensure stable gripping.

Meanwhile, based on the structure described above, vertical adjustment of air discharged through the air outlet 10 will be described with reference to FIGS. 6A to 6C.

First, as illustrated in FIG. 6A, in an initial position, the first rear wing 310 and first assist wing 320 and the second rear wing 350 and second assist wing 360 have structures corresponding to each other and are arranged side by side, discharging air through the center of the air outlet 10.

As illustrated in FIG. 6B, when desired to adjust the direction of discharged air upward, the user moves the manipulation member 424 disposed outside the housing 100 upward, allowing the pivot gear 410 to rotate clockwise.

Here, the mid-gear 332 meshing with the pivot gear 410 rotates counterclockwise, allowing the rear wing gear 330 meshing with the mid-gear 332 to rotate clockwise and allowing the rear wing 310 coupled to the rear wing gear 330 to rotate clockwise together therewith to thereby rotate the rear wing 310 upward, eventually discharging the air through the air outlet 10 in the arrow direction shown in FIG. 6B.

Here, because the second rear wing 350 is connected to the first rear wing 310 via the link member 370, the second rear wing 350 rotates in the same direction, and the rotation shaft of the first assist wing 320 and the rotation shaft of the second assist wing 360 each move along the corresponding guide holes H to support the rotation positions of the first rear wing 310 and the second rear wing 350 spaced from each other.

More preferably, the first assist wing 320 moves forward in the guide hole H from the initial position and assists the first rear wing 310 to rotate about the rotation shaft thereof coupled to the rear wing gear 330 to thereby support the rotation position.

Conversely, as illustrated in FIG. 6C, when desired to adjust the direction of discharged air downward, the user moves the manipulation member 424 disposed outside the housing 100 downward, allowing the pivot gear 410 to rotate counterclockwise.

Similar to the upward adjustment described above, the mid-gear 332 meshing with the pivot gear 410 rotates clockwise, allowing the rear wing gear 330 meshing with the mid-gear 332 to rotate counterclockwise and allowing the rear wing 310 coupled to the rear wing gear 330 to rotate counterclockwise together therewith to thereby rotate the rear wing 310 downward, eventually discharging the air through the air outlet 10 in the arrow direction shown in FIG. 6C Here, because the second rear wing 350 is connected to the first rear wing 310 via the link member 370, the second rear wing 350 rotates in the same direction, and the rotation shaft of the first assist wing 320 and the rotation shaft of the second assist wing 360 each move along the corresponding guide holes H to support the rotation positions of the first rear wing 310 and the second rear wing 350 spaced from each other.

More preferably, the second assist wing 360 moves forward in the guide hole H from the initial position and assists the second rear wing 350 to rotate about the rotation shaft thereof by the first rear wing 310 to thereby support the rotation position.

Meanwhile, based on the structure described above, lateral adjustment of air discharged through the air outlet 10 will be described with reference to FIGS. 8A to 8C.

First, as illustrated in FIG. 8A, when the manipulation module 400 is positioned in the initial position, the plurality of front wings 210 also is positioned in the initial position, discharging air through the center of the air outlet 10.

Here, as illustrated in FIG. 8B, when desired to adjust the direction of discharged air to the right, the user moves the manipulation member 424 disposed outside the housing 100 rightward, allowing the rod 423 extending from the main body 422 to axially move to the left.

Here, because the main body 422 axially moves left and right within the pivot upper 422*a* and pivot lower 422*b* and because the pivot gear 410 is coupled to the pivot upper 422*a* and pivot lower 422*b* fixed in the pivot housing 400*a*, the pivot gear 410 may not be separated from the mid-gear 332 when the main body 422 rotates to the left and to the right.

As described above, when the rod 423 axially moves to the left, the coupling portion 422-1 and the holder portion 422-2 also move to the left, allowing the guide rail R coupled to the rail shaft 220 to move to the housing 100 side to thereby allow the rail shaft 220 to slide to axially rotate the front wing 210.

Here, because the rail shaft 220 is caught in the connection portion 202 of the front wing 210 (see FIG. 7), when the rail shaft 220 slides to axially rotate the front wing 210 at the outermost side, the rest of the front wings 210 may be axially rotate together therewith.

As such, the front wing 210 is axially rotated by the slide movement of the rail shaft 220, adjusting the direction of air to the right.

Conversely, as illustrated in FIG. 8C, when desired to adjust the direction of air to the left, the user moves the manipulation member 424 disposed outside the housing 100 leftward, allowing the rod 423 extending from the main body 422 to axially move to the right.

Here, when the rod 423 axially moves to the right, the coupling portion 422-1 and the holder portion 422-2 also move to the right, allowing the guide rail R coupled to the rail shaft 220 to move away from the housing 100 to thereby allow the rail shaft 220 to slide to axially rotate the front wing 210.

As such, the front wing 210 is axially rotated by the slide movement of the rail shaft 220, adjusting the direction of air to the left.

Meanwhile, as illustrated in FIG. 3, the air vent for a vehicle according to this embodiment may further include a damper module 500.

The damper module 500 is mounted within the housing 100 by being spaced apart from the front wing module 200 and from the rear wing module 300, and may selectively block air discharged through the air outlet 10.

To this end, the damper module 500 includes a damper 510, a bevel gear 520, and a connection rod 530, as shown in FIG. 3.

The damper 510 is vertically rotatably coupled within the housing 100, and may have a height corresponding to the height of the housing 100

Furthermore, the bevel gear **520*a* is engaged with a damper gear 510*a* connected to the rotation shaft of the damper 510, and is configured to transmit a driving force to rotate the damper 510**.

The bevel gear 520 may be directly engaged with the damper gear **510*a*, but may also be provided in plural and meshed with each other in consideration of the layout of the arrangement position of the damper 510**.

The connection rod 530 is connected to the manipulation module 400, more specifically, the rod 423. When the rod 423 rotates, the connection rod 530 rotates together therewith to transmit a driving force for rotating the damper 510 to the bevel gears 520.

As such, so as to transmit the driving force to the bevel gears 520, the connection rod 530 is, as illustrated in FIG. 4, connected to the rod 423 via a universal joint **530*a***.

The universal joint **530*a* allows the rod 423 to axially rotate with respect to the connection rod 530 in left-right and up-down directions. With this connection structure, the connection rod 530 is rotatable by the rod 423**.

Therefore, when the user grabs and rotates the manipulation member 424, the rod 423 rotates along the internal circumferential surface of the coupling portion 422-1, rotating the connection rod 530 and transmitting the driving force to the damper gear **510*a* via the plurality of bevel gears 520 so as to selectively rotate the damper 510, and as a result, air discharged from the air outlet 10 may be selectively blocked by the rotational motion of the manipulation member 424**.

As is apparent from the above description, the present disclosure provides the following effects.

According to the present disclosure, a wing knob for adjusting the direction of wind is installed not to block an outlet, and the inclination angles of a front wing and a rear wing connected to the wing knob may be selectively adjusted by rotating the wing knob in up-down and left-right directions, preventing the wing knob from disturbing the wind discharged through the outlet.

Furthermore, according to the present disclosure, a problem in which wind splits due to collision with the wind knob while being discharged from the outlet may be prevented, allowing the wind to be smoothly discharged in the direction desired by a user.

In the above, embodiments of the present disclosure have been described with reference to the accompanying drawings. However, those skilled in the art to which the present disclosure pertains will understand that various modifications may be made therefrom, and that all or part of the above-described embodiment(s) may be selectively combined. Therefore, the true technical protection scope of the present disclosure should be determined by the technical ideas of the appended claims.

The invention claimed is:

1. An air vent for a vehicle, the air vent comprising:
- a housing including an air outlet;
- a front wing module mounted within the housing, and configured to adjust air discharged through the air outlet in left and right directions;
- a rear wing module mounted within the housing and positioned spaced apart from the front wing module, the rear wing module being configured to adjust the air discharged through the air outlet in up and down directions; and
- a manipulation module connected to the front wing module and to the rear wing module from outside the housing and positioned spaced apart from the air outlet, the manipulation module being configured to adjust the air discharged through the air outlet in the left and the right or the up and the down directions;

wherein the rear wing module comprises:
- a first rear wing vertically rotatably coupled within the housing;
- a first assist wing connected to the first rear wing and configured to rotate in conjunction with the first rear wing when the first rear wing rotates and changes in angle;
- a rear wing gear coupled to a rotation shaft of the first rear wing, and configured to rotate in forward and reverse directions to rotate the first rear wing,
- a second rear wing having a same shape as the first rear wing, and vertically rotatably coupled within the housing and positioned spaced apart below the first rear wing;
- a second assist wing connected to the second rear wing and configured to rotate in conjunction with the second rear wing when the second rear wing rotates and changes in angle; and
- a link member connecting the first rear wing to the second rear wing, the link member being configured to guide the second rear wing to rotate with a rotation radius same as a rotation radius of the first rear wing when the first rear wing rotates, wherein the first assist wing has a first rotation shaft, and is configured to support the first rear wing by the first rotation shaft moving to a different position when the first rear wing rotates, and the second assist wing has a second rotation shaft, and is configured to support the second rear wing by the second rotation shaft moving to a different position when the second rear wing rotates.

2. The air vent of claim 1, wherein the housing comprises a spacer configured to support two sides of the rear wing module.

3. The air vent of claim 2, wherein the spacer comprises a first guide hole defining a movement path for the first rotation shaft and a second guide hole defining a movement path for the second rotation shaft.

4. The air vent of claim 3, wherein the first guide hole extends in length to define the first movement path, and wherein the second guide hole extends in length to define the second movement path.

5. The air vent of claim 1, wherein the manipulation module comprises:
- a pivot gear meshing with a mid-gear meshing with the rear wing gear; and a wing knob having one side to which the pivot gear is mounted, and configured to vertically pivot within a pivot housing to guide the mid-gear to rotate by the pivot gear moving together with the wing knob.

6. The air vent of claim 5, wherein the wing knob comprises:

a main body forming a rotation axis within the pivot housing, the main body having a pivot upper and a pivot lower coupled to each other, and extending rearwards in length to form a rod; and a manipulation member, mounted at a front of the main body and protruding outwardly for gripping.

7. The air vent of claim 6, wherein the main body comprises:

a coupling portion coupled to the rod in a same plane as the front wing module; and a holder portion surrounding the coupling portion, and configured to allow the coupling portion to slide along a guide rail when the wing knob moves up and down.

8. The air vent of claim 7, wherein the holder portion is rail-coupled to the guide rail, and when the wing knob moves in the left and right directions, the holder portion moves together with the guide rail in left and right directions.

9. The air vent of claim 1, wherein the front wing module comprises:

a front wing coupled within the housing and being rotatable in the left and right directions; and a rail shaft connected to the front wing and slidable outwards from the housing.

10. The air vent of claim 9, wherein the front wing is upright and comprises a first front wing and a second front wing spaced apart at equal intervals, and wherein the first and second front wings rotate together in a same direction when either the first or second front wing connected to the rail shaft axially rotates.

11. The air vent of claim 9, wherein the manipulation module is coupled to the rail shaft and is configured to move left and right to allow the rail shaft to reciprocally-slide.

12. The air vent of claim 1, further comprising a damper module mounted within the housing and positioned spaced apart from the front wing module and from the rear wing module, and configured to block the air discharged through the air outlet.

13. The air vent of claim 12, wherein the damper module comprises:

a damper vertically rotatably coupled within the housing;

a bevel gear engaged with a damper gear connected to a rotation shaft of the damper, the bevel gear being configured to transmit a driving force for rotating the damper; and a connection rod connected to the manipulation module, and configured to transmit the driving force for rotating the damper to the bevel gear by rotating together with the manipulation module.

14. The air vent of claim 13, wherein the connection rod is connected to the manipulation module via a universal joint.

* * * * *